June 3, 1958  J. H. JAIDINGER  2,837,616
ADJUSTABLE CONTACT ASSEMBLY FOR RELAYS AND THE LIKE
Filed Jan. 11, 1957
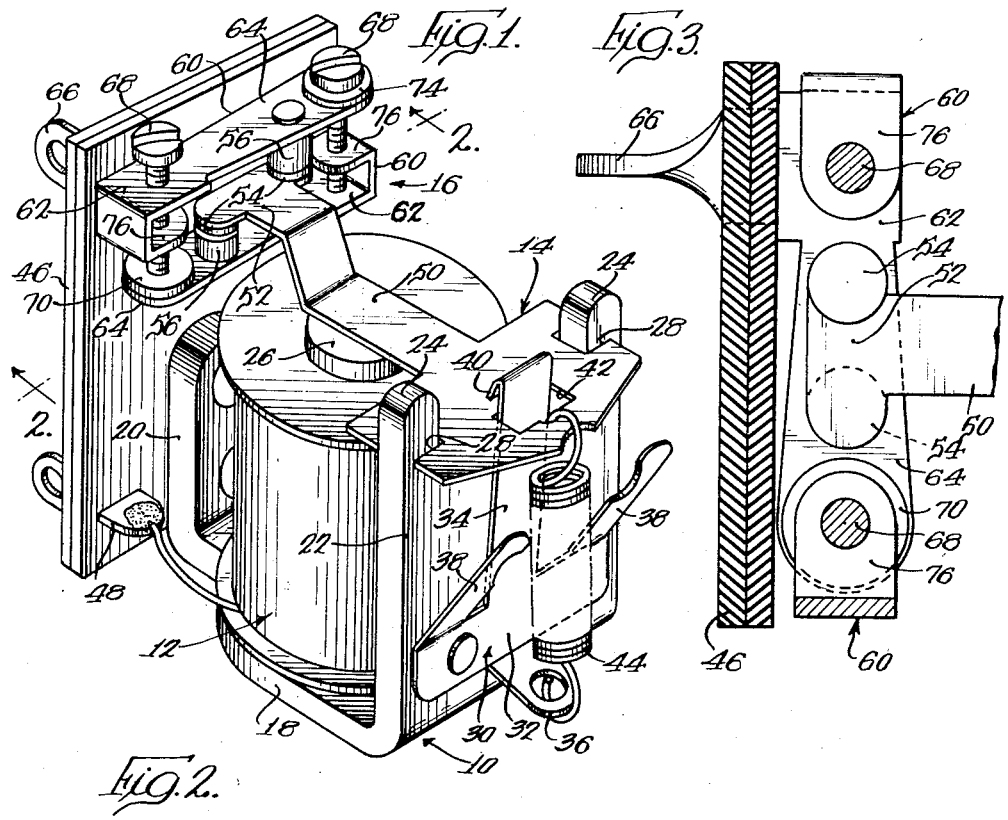
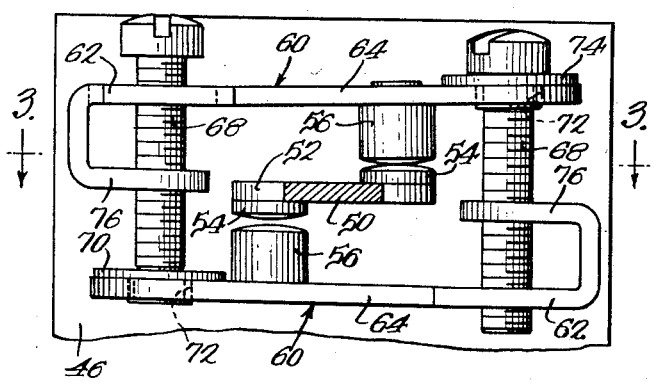
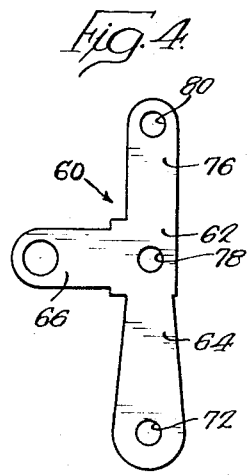
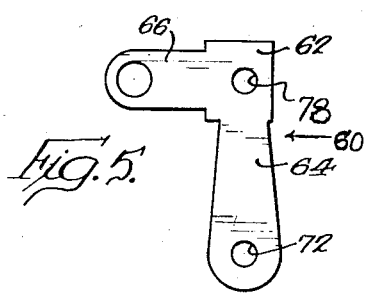
INVENTOR.
John H. Jaidinger
BY
Brown, Jackson, Boettcher & Dienner
Att'ys __United States Patent Office__ 2,837,616
Patented June 3, 1958

2,837,616

ADJUSTABLE CONTACT ASSEMBLY FOR RELAYS AND THE LIKE

John H. Jaidinger, Chicago, Ill.

Application January 11, 1957, Serial No. 633,749

10 Claims. (Cl. 200—166)

The present invention relates to an improved adjustable contact assembly for relays, switches and the like, and to an improved relay embodying said assembly.

While the present invention is not restricted as to the size of a given embodiment thereof, the invention has particular relation to relays and switches of exceedingly small size and provides an optimum solution to problems peculiar to such equipment that might not be encountered in equipment of larger size. For this reason, reference is frequently made herein to small size relays and switches for purposes of illustrating the special capabilities of the invention. Such references of course are for purposes of exemplification and are not to be considered limiting.

In relays and switches of small size and/or precision manufacture, adjustability of the contact assembly has been practically impossible of attainment in the minute space allowed for the contacts. Yet, the precise nature and/or minute size of the relay or switch require accurate location of the contacts, thus imposing exacting manufacturing tolerances which result in high production costs. Moreover, the contacts can safely be adjusted only under the accurate supervision and precise control and testing of the manufacturer or a technical laboratory. Thus, field adaptability of such units to changing conditions is practically non-existent.

The object of the present invention is to provide an improved adjustable contact assembly capable of embodiment in exceedingly small size for installation even in miniature, sub-miniature and micro size relays and switches, which assembly facilitates throughout the life of the relay or switch accurate adjustment of the contacts, not only under laboratory conditions but under adverse field conditions.

Another object of the invention is to provide an improved adjustable contact assembly of the character defined which does not necessitate an increase in the size of the relay or switch, yet provides for micrometer accuracy of adjustment of the location of the stationary contacts and the excursion of the movable contacts.

A more particular object of the invention is the provision of an improved adjustable contact assembly comprising a pair of contact carriers each including an adjustable blade portion and a mounting portion, the carriers being mounted in spaced opposed relation with the mounting portion of each aligned generally with the blade portion of the other, and an adjusting screw threaded through the mounting portion of each carrier and engaging the blade portion of the other carrier to effect adjustment thereof.

Still another object of the invention is to provide, in the assembly defined, a contact intermediate the ends of the blade portion of each carrier and micrometer thread adjusting screws, the screws being aligned with the free end of the blade portion engaged thereby so that considerable rotation of each screw is required to effect slight adjustment of the respective contact, whereby extreme accuracy of contact adjustment is facilitated.

It is also an object of the invention to provide in the combination defined a movable contact blade having an end portion extending between the blade portions of the stationary contact carriers generally at right angles to the longitudinal axes of the carriers thereby to maintain minimum dimensions in all directions.

A further object of the invention is the provision of an improved adjustable contact carrier for the assembly, the carrier comprising a base portion, a terminal lug extending outwardly from the base portion and a blade portion extending outwardly from the base portion at right angles to the terminal lug, the lug being insertable through a slot in a mounting board and being twistable to secure the carrier to the board with the blade portion thereof extending in spaced parallel relation to the board. Such carrier is ideal in the assembly described and also accommodates ready adjustment directly by hand, without the use of screws, in switches and relays that do not require precision adjustment.

A still further object of the invention is the provision of an improved relay embodying said adjustable contact assembly and including, in particular, an improved movable contact means to be actuated by the relay armature, the contact means including a narrow blade having a T-shaped outer end and a contact carried by each end of the head of the T, said contacts being disposed to opposite sides of the blade for engagement respectively with a pair of stationary contacts, the T shape of the blade incorporating in the functional characteristics of the relay the torsional influence of the blade to mitigate against armature rebound.

These and other objects of the present invention will become apparent in the following detailed description of preferred embodiments of the invention.

Now, in order to acquaint those skilled in the art with the manner of making and using my improved adjustable contact assembly and my improved relay, I shall describe, in connection with the accompanying drawing, preferred embodiments of the invention and preferred manners of making and using the same.

In the drawing, wherein like reference numerals indicate like parts:

Figure 1 is an enlarged perspective view of a sub-miniature relay embodying the present invention;

Figure 2 is a front elevation of the improved adjustable contact assembly of the invention, the view being taken substantially on line 2—2 of Figure 1 and on a scale approximately twice that of Figure 1;

Figure 3 is a horizontal section of the adjustable contact assembly, the view being taken substantially on line 3—3 of Figure 2;

Figure 4 is a plan view, on a reduced scale, of the stamping from which the contact carrier employed in the embodiment of the invention shown in Figures 1 to 3 is formed; and Figure 5 is a plan view of a modified form of contact carrier.

Referring now to the drawings, and particularly to Figure 1, my improved relay is shown as comprising a permeable frame 10, an electromagnetic coil 12, an armature 14 and a contact assembly 16, the movable contacts of which are actuated by the armature 14.

The frame 10 includes a base portion 18, a relatively short, narrow, upstanding front leg 20 and a relatively long, wide, upstanding rear leg 22 provided at its upper end with a pair of spaced parallel tabs or tongues 24. The leg 22 is preferably of a width corresponding to the diameter of the coil 12 and the edge portion thereof between the tabs 24 is disposed approximately level with the upper surface of the coil assembly. The frame 10 is suitably stamped out of sheet stock and then bent to the generally U-shape form shown. In stamping the frame, the edge portion of the leg 22 lying between the tabs 24 is preferably formed to define substantially a knife edge for providing a pivotal support for the armature 14.

The electromagnetic coil 12 includes a spool type support on which the coil is wound and a stationary permeable core 26, the core being physically and magnetically connected to the base 18 of the frame 10 at its lower end and the coil being supported on said base. The core 26 at its upper end extends slightly above the coil to approximately the level of the knife edge provided on the leg 22 of the frame to constitute the pole piece to which the armature 14 is attracted upon energization of the coil.

The armature 14 is preferably stamped from permeable sheet stock and includes an enlarged rearward portion of a width equal approximately to the width of the leg 22 of the frame 10. At its side edges, the enlarged portion of the armature is slotted, as indicated at 28, for interlocking assembly with the tabs 24 of the leg 22, the armature thus being pivotally supported on the knife edge portion of the leg 22 intermediate the tabs 24. The tabs 24 when engaging in the slots 28 retain the armature against lateral disassociation from the coil and frame. To retain the armature against disassociation axially of the coil and frame, a retaining or locking member 30 is provided.

The member 30 is disclosed in detail in my copending application, Serial No. 536,537, filed September 26, 1955, and comprises a sheet metal stamping including a base portion 32, a central longitudinally extending spring leg 34, a transverse tab 36 and a pair of inclined arms or tabs 38 disposed to opposite sides of the leg 34. The base portion 32 is secured to the frame leg 22 adjacent the lower extremity thereof, and the spring leg 34 extends upwardly above the edge portion of the leg 22 between the tabs 24. The leg 34 is bent forwardly and downwardly at its upper end to define a latch or lock 40, the lower end of which is located at a level intermediate the ends of the tabs or tongues 24. The armature 14 is provided with an aperture 42 therethrough immediately rearwardly of the slots 28. The spring leg 34 extends through the aperture 42 and normally abuts the frame leg 22 with the latch 40 thereof overlying the armature to prevent inadvertent disassociation of the armature from the frame in a direction axially of the coil 12. At the rearward edge of the aperture 42 and the rearward edge of the armature, the armature is provided with opposed notches for the reception of one end of an armature biasing spring 44. The spring 44 is preferably a helically wound tension spring disposed with its axis generally parallel to the frame leg 22, the spring being connected at its lower end to the tab 36 of the member 30. The tabs 38 of the member 30 extend to opposite sides of the spring 44 to protect the same from damage and from inadvertent displacement, as well as serving a purpose to be described. The member 30 thus provides a lock for the armature, a mounting for the armature biasing spring and protection for said spring. To remove the armature from the relay, it is merely necessary to release one end of the spring 44, flex the leg 34 rearwardly to align the latch 40 with the aperture 42 and then remove the armature in a vertical direction.

The contact assembly 16 is mounted on a terminal board 46 which is secured to the front leg 20 of the frame 10 generally parallel to and coextensive with the rear leg 22. In particular, the board 46 is of a width equal approximately to the diameter of the coil and of a height slightly in excess in the combined height of the coil and armature. In the lower regions thereof, the board carries at least two and preferably three terminal lugs 48 (only one of which is shown) of the character described and claimed in my said copending application, Serial No. 536,537. Two of the lugs constitute the terminals for the coil winding and the third, the terminal for the movable contact or contacts of the relay.

To the extent thus far described, the relay is generally of a previously known construction and assembly, namely that of the relay disclosed in said application, Serial No. 536,537. This relay is particularly adapted for embodiment in exceedingly small sizes, for example, 1 x ⅞ x ½ inches, the representation thereof in Figure 1 being approximately four times scale. In Figures 2 and 3, the contact assembly of a relay of the size stated is shown at approximately eight times scale. In such relays and comparable electrical equipment, the minute space permitted for the contact assembly has rendered facile adjustable contact means substantially impossible of attainment. The objects of the present invention, in brief, are to provide an adjustable contact assembly capable of embodiment in such size as to be incorporated in relays, switches and equipment of the character and size referred to without increasing the size of the equipment, and to provide an improved armature or movable blade structure for cooperation with said assembly.

As shown in Figure 1, the armature 14 of the relay of the present invention is formed of particularly thin metal and includes an elongate narrow blade portion 50 extending forwardly from the pivotally supported portion of the armature over the core 26 of the electromagnetic coil and to the contact assembly 16. In the embodiment shown, the front to rear dimension of the relay is most critical and the contact assembly 16 has thus been disposed above the coil 12 to avoid even a minute increase in this dimension. In view of this fact, the blade portion 50 of the armature is bent upwardly at a point forwardly of the core 26 to the height of the assembly 16 and then extends forwardly to said assembly. In other embodiments, the armature 14 may extend horizontally from its pivotal support to the contact assembly, or may even be bent downwardly forwardly of the coil to maintain a minimum height of the relay.

The longitudinal axis of the armature is disposed perpendicular to the terminal board 46 and the blade portion 50 thereof terminates in a T-shaped end portion 52, the head of which is disposed closely adjacent and parallel to the board. Adjacent each end thereof, the head of the T-shaped portion 52 carries a contact 54. The two contacts 54 are of light weight and disposed to opposite sides of the blade for cooperation respectively with one of a pair of relatively stationary contacts 56.

Due to the light-weight and small size of the blade portion 50 of the armature and the contacts 54 carried thereby, the portions of the armature subject to appreciable degrees of movement are light-weight and adapted for exceedingly rapid actuation, and particularly, for actuation at exceedingly short intervals at time so that the armature is adapted for high frequency oscillatory movement between the end positions defined by the stationary contacts 56. In particular, in a specific embodiment of the invention, the relay is employed to pulse an electric tachometer at the rate of 5,000 pulses per minute, which requires that the armature move from one stationary contact to the other 10,000 times per minute. In the preferred structure, to accommodate the rapidity of operation required, armature excursion at the contacts is 0.002 to 0.003 inch, and armature rebound cannot be permitted. The T-shape of the end of the armature, with the contacts disposed as described in a two pole double throw arrangement, affords the particular advantages that upon engagement of one movable contact 54 with its cooperating stationary contact 56, the blade 50 is loaded in torsion, thus cushioning the impact load on the contacts and mitigating against armature rebound. These advantages are unexpected results of a blade end configuration conceived for purposes of facilitating contact adjustment.

The contacts 54 carried by the armature are preferably connected electrically to one of the three terminal lugs 48 provided in the lower regions of the terminal board 46, the connection being effected by means of a lead (not shown) extending from the terminal lug to one of the arms or tabs 38 of the retaining member 30. Thus, the arms 38 serve the dual functions of protecting the spring from damage and displacement and of constituting terminal connectors for the contacts carried by the relay armature.

To accommodate accurate location of the stationary contacts 56, to adjust armature excursion to the minute distance above stated, and to facilitate whatever adjustments may be required in the relay, both in initial assembly and subsequent use in the field, the present invention provides an improved assembly of adjustable stationary contact means which has heretofore been indicated generally by the numeral 16. Referring to Figures 1 to 3, the assembly comprises a pair of contact carriers or blades 60 each including a mounting portion 62 and an integral blade portion 64. The mounting portion 62 includes a generally rectangular base and an elongated terminal lug 66 of a width less than the corresponding dimension of the base extending therefrom at right angles to the blade portion 64. The terminal lug is adapted to be passed through a slot in the terminal board 46 until the shoulders defined on the base portion of the carrier adjacent the lug abut against the board. The lug is then adapted to be twisted through an angle of 90 degrees to draw the base into firm engagement with the board and to secure the carrier to the board.

To insure rigid mounting of each carrier on the terminal board 46, the board is preferably comprised of at least two sheets of insulating material such as Bakelite. Each sheet is accurately slotted to the same dimensions as, or to slightly smaller dimensions than, the cross sectional dimensions of the terminal lug. By employing thin sheets of insulating material, the slots can be stamped in the sheets with extreme accuracy, at least at one surface of the sheet, so that the terminal lug will have a press fit in the terminal board, thus fixedly to retain the lug and the base portion of the blade or carrier against movement.

The blade portion 64 of each carrier 60 is of a width less than the corresponding dimension of the mounting portion thereof, so that the last-named portion and the lug 66 mount the blade portion in spaced parallel relation to the board, the blade portion being free to move at its outer end.

The two carriers 60 are mounted in opposed relation to one another on the terminal board 46 with the mounting portion of each aligned generally with the free outer end portion of the blade 64 of the other carrier, the two blades or blade portions 64 being disposed generally parallel to one another and the plane of the armature, with their longitudinal axes at right angles to the longitudinal axis of the armature. To establish this relationship, the terminal board is provided with two vertically spaced and horizontally offset horizontal slots. The two blade portions 64 intermediate the ends thereof carry the relatively stationary contacts 56 of the assembly, each blade carrying one contact and the two contacts being offset from one another longitudinally of the blades to opposite sides of the axis of the armature for cooperation with the armature carried contacts 54. The stationary contacts 56 are preferably large to afford long contact life and to separate the end portion 52 of the armature from the carriers 60, so that the carriers will not interfere with normal movement and torsional loading of the armature.

To effect minute adjustment of the location of the stationary contacts 56, a micrometer thread screw 68 is threaded through the mounting portion 62 of each of the carriers 60, the respective screws engaging the outer end portion of the blade 64 of the other carrier in insulated relation thereto for varying the inclination of the respective blade relative to its mounting portion.

In the embodiment herein disclosed, the contact assembly is most readily accessible from above and the headed ends of the screws 68 are therefore upwardly exposed. The screw threaded in the upper or outermost carrier 60 extends therethrough and engages a button 70 of insulating material which is mounted within an aperture 72 (see Figures 2, 4 and 5) provided in the outer end portion of the blade of the lower or innermost carrier. The screw 68 threaded to the lower carrier extends axially through a flanged collar 74 mounted in a corresponding aperture 72 in the outermost carrier and the head of the screw engages against the flange of said collar. The blade portions of the two carriers are initially bent upwardly or outwardly so as to be normally biased in that direction, whereby the screws facilitate adjustment of the location of the contacts 56. Since the screws are provided with micrometer threads, and since they engage the outer ends of the blades and the contacts 56 are disposed inwardly thereof, the screws must be rotated a considerable extent to effect even slight movement of the contacts. Thus, the adjusting screws in the described assembly facilitate at any time exceedingly accurate adjustment of contact location and armature excursion.

To accommodate maximum adjustment in a minimum space with the degree of accuracy afforded by the assembly disclosed, the contacts 56 are preferably offset from one another longitudinally of the blades to define an effective lever arm between each contact and the mounting portion of the blade carrying the same, and yet provide, when adjusted, a rigid support for the stationary contact so that the contacts do not bound away from the armature when engaged thereby, thus to insure an effective switching function and to mitigate against chattering of the armature. This feature in conjunction with the torsional loading characteristic of the blade 50 insures optimum relay operation even at exceedingly high speeds.

In the preferred embodiment, the carrier for each relatively stationary contact includes a U-shaped mounting portion as is shown in Figures 1 to 3. Such form of carrier suitably is formed from a flat sheet stamping of the character shown in Figure 4 which includes, in addition to the base portion 62, the blade portion 64 and the lug 66, an elongate tab 76 extending from the side of the base portion opposite the blade portion in longitudinal alignment with the blade portion. The base portion 62 is provided centrally thereof with a tapped bore 78 for threaded reception of one of the screws 68, and the tab 76 is provided adjacent its end with a correspondingly tapped bore 80. The tab 76 is bent to dispose the outer end portion thereof parallel to the base 62 and the bore 80 in alignment with the bore 78. In assembly of one of the screws 68 with the U-shaped mounting portion thus defined, the tab 76 is resiliently stressed relative to the base 60, either by separating the two or squeezing them together a distance of several screw threads, so that when the assembly is completed the two legs of the U exert forces in opposite directions along the axis of the screw, thereby locking the screw in adjusted position. When readjustment is necessary, the screws can readily be rotated manually, but the locking function afforded by the tabs 76 otherwise retains the screws 68 against movement.

In a more simplified embodiment, the tab 76 and the U-shaped locking portion defined thereby may be omitted, in which case the carrier may be formed as shown in Figure 5, wherein the same comprises merely the base portion 62, the blade portion 64 and the terminal lug 66. In addition, in relay and switches that do not require the minutely accurate adjustment afforded by the embodiment of the invention previously described, a coarser thread adjusting screw may be employed or the adjusting screws may be entirely dispensed with. In the latter case, contact adjustment may be effected by bending the blade portion 64 of the contact carriers 60 to desired position. Also in said latter case, it is not necessary that the contact carriers be mounted in opposed relation to one another as herein shown, although such mounting is usually preferred. Likewise, when the adjusting screws are omitted, the stationary contacts may be carried at the ends of the blade portion 64, suitably by mounting the same in the bores or apertures 72. Adaptations of these various modifications will be obvious to those skilled in the art.

In the above described embodiments of the invention, it is apparent that the two contact carriers of the assembly are preferably formed from identical sheet metal stampings, thereby insuring economical manufacture of the assembly.

From the foregoing, it is apparent that the contact means of the invention is adapted to be confined in an exceedingly small space. As mounted by means of the twistable tab 66, the contact carrying blade 64 is disposed closely adjacent and parallel to the terminal board and does not protrude therefrom a distance appreciably in excess of the diameter of the stationary contacts. In particular the adjustable blade of the invention protrudes no further in a significant direction than the non-adjustable contact means heretofore employed in the art. In a specific embodiment of the present invention, particularly adapted for use in the relay disclosed, the contact assembly protrudes less than 1/8 inch from the inner surface of the terminal board 46, is less than 1/2 inch long, and is less than 5/16 of an inch in height.

Thus, all of the objects and advantages of the invention have been shown herein to be obtained in a highly economical, convenient and practical manner.

Hereinbefore, the adjustable contact assembly of the invention has been described in particular relation to the relay disclosed. It is to be appreciated, however, that the contact assembly, including the blade 50 and the carriers 60, is equally adapted to other equipment, especially switches, without appreciable modification, and that such adaptation is obvious to those skilled in the art.

While I have described and shown what I regard to be preferred embodiments of my invention, it will be appreciated that various changes, rearrangements and modifications may be made therein without departing from the scope of the invention, as defined by the appended claims.

I claim:

1. An adjustable contact assembly comprising a pair of contact carriers, each of said carriers comprising a mounting portion and a blade portion, said blade portions being movable at their outer ends and adapted to carry a contact, said carriers being mounted in spaced opposed relation with the mounting portion of each aligned with the outer end of the blade portion of the other, a movable contact blade having an outer end portion extending between the blade portions of said carriers with its longitudinal axis generally perpendicular to the longitudinal axes of said blade portions, and an adjusting screw threaded through the mounting portion of each carrier and engaging the outer end of the blade portion of the other carrier to adjust the position of each blade portion relative to said movable blade.

2. An adjustable contact assembly comprising a pair of contact carriers, each of said carriers comprising a mounting portion and a blade portion, the blade portion of each carrier being movable at its outer end and adapted to carry a contact intermediate its outer end and said mounting portion, said carriers being mounted in spaced opposed relation with the mounting portion of each aligned with the outer end of the blade portion of the other, a movable contact blade having an outer end portion extending between the blade portions of said carriers with its longitudinal axis generally perpendicular to the longitudinal axes of said blade portions, and an adjusting screw threaded through the mounting portion of each carrier and operatively engaging the outer end of the blade portion of the other carrier to effect accurate adjustment of the position of each blade portion relative to said movable blade, said mounting portion of each carrier being of U-shape and having a pair of legs through which the respective adjusting screw is threaded, said legs exerting oppositely directed forces along the axis of the respective screw to lock the screw in adjusted position.

3. An adjustable contact assembly comprising a pair of contact carriers, each of said carriers comprising a mounting portion and a blade portion, said carriers being mounted in spaced opposed relation with the mounting portion of each aligned with the outer end of the blade portion of the other, a movable contact blade having a T-shaped outer end extending between the blade portions of said carriers, the longitudinal axis of said movable blade extending generally perpendicular to the longitudinal axes of said blade portions, a contact mounted adjacent each end of the head of the T-shaped end of said movable blade, said contacts being disposed on opposite sides of said movable blade, a contact carried by the blade portion of each of said carriers intermediate the outer end of the respective blade and the mounted portion of the respective carrier, said contacts on said blade portions of said carriers being aligned respectively with the contacts on said T-shaped end of said movable blade, and an adjusting screw threaded through the mounting portion of each carrier and operatively engaging the outer end of the blade portion of the other carrier to effect accurate adjustment of the position of the contact carried by each blade portion relative to the respective contact on said T-shaped end of said movable blade.

4. An adjustable contact comprising a base portion, an elongate terminal lug extending from said base portion, and an elongate blade portion extending from said base portion at right angles to the terminal lug, said blade portion being freely movable at its outer end and adapted to carry a contact, said base portion being of U-shape and including a pair of legs having apertures therethrough, and a screw threaded through said apertures, said legs of said base portion exerting oppositely directed forces along the axis of said screw to lock said screw in adjusted position.

5. An adjustable contact assembly comprising a contact carrier including a base portion, an elongate twistable terminal lug of a width less than the corresponding dimension of said base portion extending from said base portion and an elongate blade portion of a width less than the corresponding dimension of said base portion extending from said base portion at right angles to the terminal lug, said blade portion being freely movable at its outer end and adapted to carry a contact, and a terminal board mounting said carrier, said terminal board having a slot therethrough of dimensions corresponding to those of said terminal lug, said lug being pressed in said slot and said base portion engaging said board, said lug being twisted to the side of said board opposite said base portion to secure said carrier to said board with said blade portion extending in spaced parallel relation to said board.

6. An adjustable contact assembly comprising a contact carrier including a base portion, an elongate terminal lug extending from said base portion and an elongate blade portion extending from said base portion at right angles to said terminal lug, a terminal board having a slot therein, said terminal lug extending through said slot and being twisted to the side of said board opposite said base portion to mount the carrier on said board with the blade portion thereof extending in spaced parallel relation to said board, and a movable contact blade having an end portion extending generally perpendicular to said board adjacent the blade portion of said carrier, said end portion of said movable contact blade and said blade portion of said carrier carrying aligned contacts, the outer end of said blade portion being movable to adjust the position of the contact carried thereby relative to the contact on said movable blade.

7. An adjustable contact assembly comprising a pair of contact carriers, each carrier including a base portion, an elongate terminal lug extending from said base portion and an elongate blade portion extending from said base portion at right angles to said terminal lug, a terminal board having a pair of spaced slots therein, the terminal lug of each carrier extending through a slot in said board and being twisted to the side of said board opposite said base portion to mount the respective carrier on said board with the blade portion thereof extending in spaced parallel relation to said board, the blade portions of said carriers extending in spaced generally parallel relation and being movable at their outer ends, a movable contact blade having an end portion extending generally perpendicular to said board between the blade portions of said carriers, said end portion of said movable contact blade being of T-shape and carrying a contact adjacent each end of the head of the T, said contacts being disposed to opposite sides of said movable blade, and a contact carried by the blade portion of each of said carriers in alignment with the respective contact on said movable blade, the outer end of each of said blade portions being movable to adjust the position of the contact carried thereby relative to the respective contact on said movable blade.

8. An adjustable contact assembly comprising a pair of contact carriers, each carrier including a base portion, an elongate terminal lug extending from said base portion and an elongate blade portion extending from said base portion at right angles to said terminal lug, a terminal board having a pair of spaced slots therein, the terminal lug of each carrier extending through a slot in said board and being twisted to the side of said board opposite said base portion to mount the respective carrier on said board with the blade portion thereof extending in spaced parallel relation to said board, the blade portions of said carriers extending in spaced generally parallel relation and being movable at their outer ends, a movable contact blade having an end portion extending generally perpendicular to said board between the blade portions of said carriers, and an adjusting screw threaded through the base portion of each carrier and operatively engaging the blade portion of the other carrier to accommodate adjustment of said blade portions relative to said movable blade.

9. An adjustable contact assembly comprising a pair of contact carriers, each carrier including a base portion, an elongate terminal lug extending from said base portion and an elongate blade portion extending from said base portion at right angles to said terminal lug, said carriers being disposed in spaced relation with the base portion of each aligned generally with the outer end of the blade portion of the other, a terminal board mounting said carriers in said disposition, said board having a pair of spaced parallel offset slots therein, said terminal lug of each carrier extending through a slot in said board and being twisted to the side of said board opposite said base portion to mount the respective carrier on said board with the blade portion thereof extending in spaced parallel relation to said board, a movable contact blade having an end portion extending generally perpendicular to said board between the blade portions of said carriers, said end portion of said movable contact blade carrying a contact on each side thereof, a contact carried by the blade portion of each of said carriers in alignment with the respective contact on said movable blade, the contact on the blade portion of each carrier being disposed intermediate the ends thereof, and an adjusting screw threaded through the base portion of each carrier operatively engaging the outer end of the blade portion of the other carrier to accommodate adjustment of the contact carried thereby relative to the respective contact on said movable blade.

10. An adjustable contact assembly comprising a pair of relatively stationary contact blades each having a mounted end and a free end, said blades being mounted in opposed relation to one another with the mounted end of each aligned generally with the free end of the other and with one blade overlying the other, a screw adjustably carried by the mounted end of each blade, the screw carried by the outermost one of said blades extending therethrough and operatively engaging the free end of the other blade, the other screw extending through the free end portion of the outermost blade and into the other blade and having a head engaging the outermost blade, the free ends of both of said blades being normally biased in an outward direction, a movable contact blade including a T-shaped end portion extending between said blades generally parallel to the planes thereof and at right angles to the axes thereof, a contact carried by each end of the head of said T-shaped portion, said contacts being disposed to opposite sides of said portion, and a contact carried by each of said blades in alignment with the adjacent one of the contacts on said T-shaped portion and in spaced relation to the free end of the respective blade.

References Cited in the file of this patent

UNITED STATES PATENTS

| | | |
|---|---|---|
| 1,592,223 | Parks et al. | July 13, 1926 |
| 2,291,410 | Pfleger | July 28, 1942 |
| 2,321,834 | Marco et al. | June 15, 1943 |
| 2,671,841 | Vaksvik et al. | Mar. 9, 1954 |